United States Patent
Drugmand et al.

[15] 3,673,386
[45] June 27, 1972

[54] ELECTRIC IMMERSION HEATERS

[72] Inventors: Lester D. Drugmand; Sidney J. Temple, both of Pittsburgh, Pa.

[73] Assignee: Emerson Electric Co., St. Louis, Mo.

[22] Filed: Oct. 19, 1970

[21] Appl. No.: 82,003

[52] U.S. Cl. .......................... 219/523, 219/316, 219/331, 219/335, 219/437, 219/534, 338/316
[51] Int. Cl. ......................... H05b 3/06, F24h 1/02
[58] Field of Search ................. 219/312, 316, 318, 321, 322, 219/328, 331, 335, 336, 523, 437, 516, 512, 513, 534; 338/316

[56] References Cited

UNITED STATES PATENTS

| | | | |
|---|---|---|---|
| 2,479,587 | 8/1949 | Morris et al. | 219/331 UX |
| 3,350,674 | 10/1967 | Kozbelt et al. | 338/316 |
| 3,444,356 | 5/1969 | Finn | 219/331 |
| 3,222,483 | 12/1965 | Tyler | 219/331 UX |

FOREIGN PATENTS OR APPLICATIONS

| | | | |
|---|---|---|---|
| 1,103,306 | 2/1968 | Great Britain | 219/336 |
| 606,226 | 8/1948 | Great Britain | 219/331 |

Primary Examiner—A. Bartis
Attorney—Michael Williams

[57] ABSTRACT

An electric heater construction particularly adapted to have its heating portion submerged in a substance contained in a tank. The heater comprises a terminal box which is disposed above and out of contact with the tank substance and a plurality of tubular members extending downwardly from the terminal box in side-by-side manner and immersed in the tank substance, one of said tubular members being adapted to contain a thermal element influenced by the thermal conditions of the tank substance, and the other tubular members containing electric heating elements for heating the tank substance. The tubular elements are held in predetermined side-by-side relationship by a plate which has openings to pass the respective tubular elements, said one tubular element being fixed in its plate opening and the other tubular elements freely passing through their plate openings, whereby to hold the tubular members in predetermined side-by-side relationship while permitting relative longitudinal movement thereof. A conventional sheathed electric heater of hairpin formation may be used for the heating elements, the terminal pins defining cold heater lengths and the plate is fixed to the one tubular element substantially at to the lower end of the heater cold lengths and carries means to indicate a warning concerning a low liquid level in the tank.

4 Claims, 3 Drawing Figures

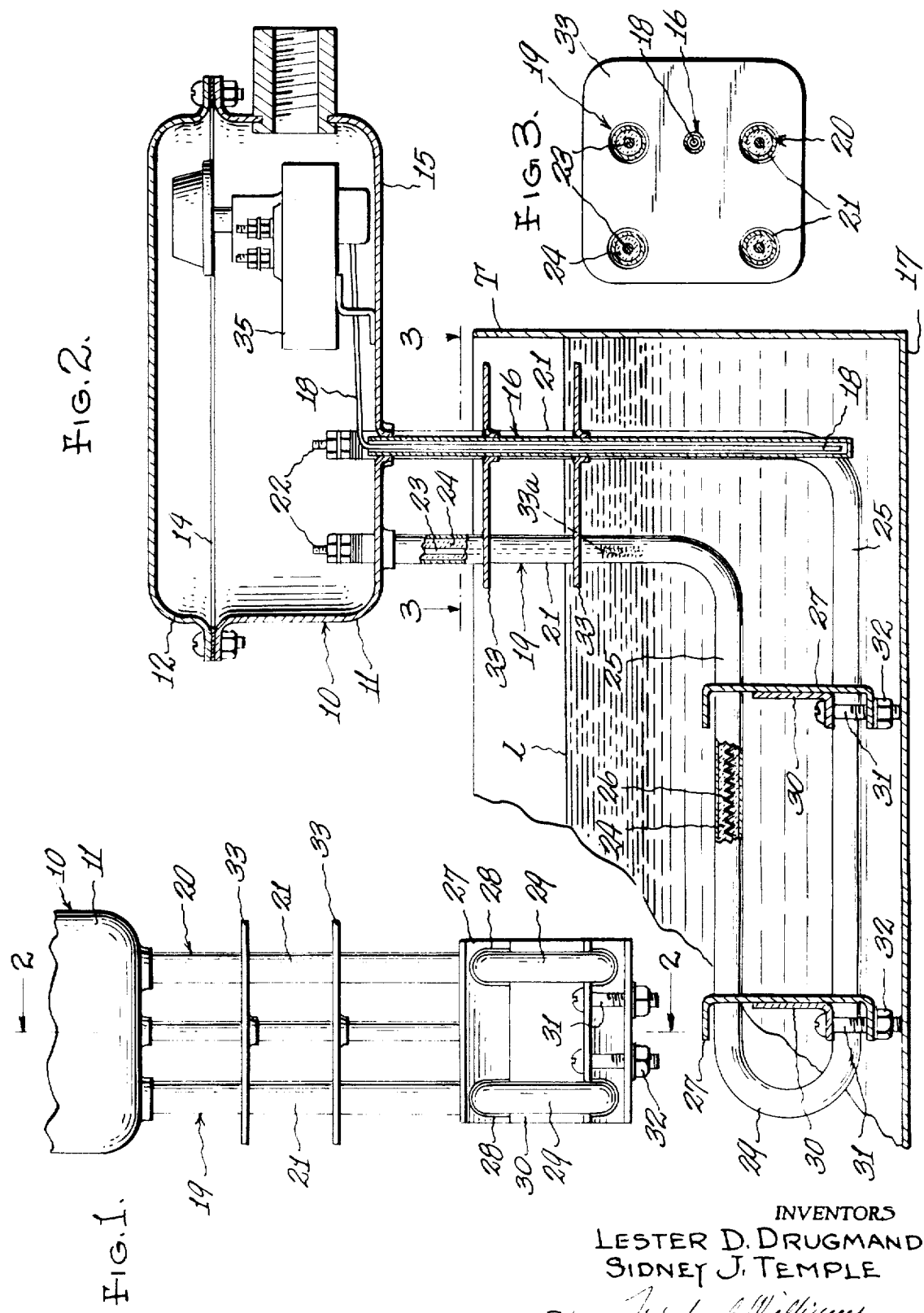

ELECTRIC IMMERSION HEATERS

BACKGROUND AND SUMMARY

Difficulty has heretofore been experienced in holding a plurality of tubular metal sheaths in predetermined side-by-side relationship because such sheaths are normally long and therefore subject to flexing and bending. This not only made their assembly with each other and with support means difficult but also in some cases affected their proper disposition within a tank containing substance to be heated.

Our invention provides a low-cost means for maintaining predetermined side-by-side relationship of such tubular sheaths and further provides a well for a thermally responsive element, when required.

The invention enables utilization of a conventional sheathed electric heater of hairpin formation. Part of the heater legs from the terminal pins to an intermediate heater part are rectilinear and disposed upright in the tank, and the remainder of the heater legs are bent angularly and are disposed along the bottom wall of the tank, the remainder part having means to space them from the bottom wall of the tank and thereby locate the heater vertically in the tank. A plate is secured across a thermal element sheath and the upright part of the heater legs substantially at to the lower end of the cold length of the heater, and the plate carries means to indicate a warning concerning a low liquid level in the tank. The plate has a fixed fit with the sheath and slide fit with the heater legs.

DESCRIPTION OF THE DRAWING

In the drawing accompanying this description and forming a part of this specification, there is shown, for purpose of illustration, an embodiment which our invention may assume, and in this drawing:

FIG. 1 is a fragmentary elevational view of a heater construction embodying our invention, FIG. 2 is a longitudinal sectional view corresponding to the line 2—2 of FIG. 1, and FIG. 3 is a transverse sectional view corresponding to the line 3—3 of FIG. 2.

DESCRIPTION OF PREFERRED EMBODIMENT

The electric heater is particularly adapted to heat substance, such as liquid L within a tank T in an over-the-side manner, as suggested in FIG. 2. As herein disclosed, a terminal box 10 is disposed outwardly of the tank and overhangs a side thereof. The box is made in the form of a container 11 which has its upper side closed by a cover 12, a gasket 14 being interposed to provide a seal.

A plurality of tubular metal sheaths extend downwardly from the lower wall 15 of the terminal box and this lower wall is formed with openings to pass such sheaths with the upper extremity of the latter sealed to the lower wall and disposed within the terminal box. One the tubular sheaths, identified by the numeral 16, is adapted to extend from the lower wall 15 to the lower wall 17 of the tank T, and although this sheath is rectilinear throughout its extent, it will be appreciated that the part within the liquid L may be curvilinear. The sheath 16 provides a well for a thermally responsive element, such as the capillary tube 18 herein shown.

The other tubular sheaths contain electric heating elements for heating the liquid L. In the disclosed embodiment, a pair of hair-pin type sheathed electric resistance heating elements 19 and 20 of identical construction are provided, each having vertical leg portions 21—21 which extend through openings in the bottom wall 15 of the terminal box 10 and are secured thereto by welding, soldering or the like. Extending through the upper ends of the leg portions 21 are the threaded ends 22 of terminal pins 23, the latter being insulated from the sheath 24 by compacted refractory material 24.

The lower leg portions 25 of the heating elements are horizontally disposed and these portions, as well as the lower parts of the vertical leg portions contain a coiled resistance wire 26 insulated from the sheath by the compacted refractory material 24. Opposite ends of the resistance wire in each heating element are mechanically and electrically connected to the respective terminal pins 23.

A pair of plates 27, each having slots 28 to pass the bight portions 29 of respective heating elements, are slipped over the lower leg portions 25 and are disposed in spaced-apart relation as shown in FIG. 2. A clamping plate 30 has a lower leg through which bolts 31 pass, the bolts also passing through a lower leg of the respective plate 27, and nuts 32 are threaded on the bolts to clamp the plate 30 against the leg portion of the heater. The lower ends of the bolts 31 rest on the lower wall 17 of the tank T to support the heater construction within the tank in spaced relation with respect to the lower wall. If a greater spacing is desired, brackets (not shown) may be connected to between the nuts 32 and the lower leg of the plates 27.

To secure the vertical leg portions 21 in predetermined side-by-side position, use is made of the sheath 16 as a focal point, and means are provided to extend crosswise of the vertically extending sheath portions, such means being fixed to the sheath 16 and slidably connected to the vertical leg portions 21. In the disclosed embodiment, such means comprise one or more plates, two plates 33 being shown in the drawings. Each plate has openings for passing the sheath 16 and the vertical leg portions 21, and each plate is welded, soldered or otherwise fixedly secured to the sheath 16. The openings 34 for passing the vertical leg portions are slightly larger than the latter.

Thus, the sheath 16 and vertical leg portions 21 are held in predetermined side-by-side relation for accurate alignment with the respective openings in the bottom wall 15 of the terminal box 10, and yet the heater legs are permitted to move relative to the plates 33 to accommodate expansion and contraction of the heater legs.

An electric switching device 35 is supported within the terminal box 10 and the upper portion of the capillary tube 18 is connected to this device to perform switching operations in well known manner. In some cases, the heater construction is used without thermal control, in which case the switching device 35 and capillary tube 18 are omitted. However, use is still made of the sheath 16 to locate the heater legs in predetermined spaced relation.

One of the plates 33 (the lower one as shown in FIG. 2) is fixed to the sheath 16 to extend in a horizontal plane which is a predetermined distance above the point 33a where a resistor 26 is connected to the lower end of a respective terminal pin 23. The point 33a defines the upper limit of the heated section of the heating elements and therefore the lower plate 33 may be used as an indicator to visually show a level below which the liquid should not fall, in order to safeguard the heating elements against excessive temperatures which may result when a portion thereof is out of the liquid. The upper surface of the lower plate may be coated with a surface to indicate the danger level, or it may carry suitable indicia, such as Warning: Minimum Liquid Level.

We claim:

1. An electric heating assembly for heating liquid in an upright tank, comprising a pair of spaced side-by-side elongated tubular members disposed within said tank in upright manner, lower portions of said tubular members being immersed within the liquid within said tank and upper portions being attached to the lower wall of a terminal box, one of said tubular members containing an electric heating element and the other adapted to contain a thermal element influenced by thermal conditions adjacent thereto, means attached to the lower end of said one tubular member for engagement with the bottom wall of said tank to space said lower end therefrom and thereby locate said one tubular member vertically in said tank, the heating portion of the heating element within said one tubular member extending from the lower end thereof upwardly to and terminating substantially at a point in line with a predetermined normal liquid level in said tank, and a plate member disposed transversely of said tubular members and having openings for passing the same, said plate member having a slide fit with said one tubular member and a fixed fit with the other tubular member and being located substantially at said predetermined normal liquid level.

2. The construction according to claim 1 wherein said plate member carries means indicative of a warning concerning the a liquid level below predetermined normal liquid level in said tank.

3. An electric heating assembly for heating liquid in an upright tank, including a conventional sheathed electric heater of hairpin formation providing a pair of legs connected at one end by a bight, said conventional heater having terminal pins extending inwardly of the opposite ends of said legs to connection with the usual resistance wire within the sheath, whereby said terminal pins define a heater cold length throughout their extent, part of the heater legs from said terminal pins to an intermediate heater part being rectilinear and being disposed upright in said tank, and the remainder of said heater legs being bent angularly and being disposed along the bottom wall of said tank, means connected to said remainder of said heater legs and engaging said tank bottom wall to space the same from said bottom wall and thereby locate said heater vertically in said tank, the lower end of the cold heater length in each leg being located substantially at the normal liquid level in the tank, a tubular member supported at one end in said tank in juxtaposed upright relation with the upright part of said heater legs, said tubular member adapted to contain a thermal element influenced by thermal conditions adjacent thereto, and a plate extending crosswise of said tubular member and said upright part of said heater legs and having openings to pass the same, said plate having a slide fit with said upright part of said heater legs and a fixed fit with said tubular member at a level substantially at the lower end of the cold length of said legs.

4. The construction according to claim 3 wherein said plate carries means indicative of a warning concerning a liquid level in said tank below said normal level.

* * * * *